US012440222B2

(12) United States Patent
Firmbach et al.

(10) Patent No.: US 12,440,222 B2
(45) Date of Patent: Oct. 14, 2025

(54) SURGICAL INSTRUMENT (71) Applicant: Aesculap AG, Tuttlingen (DE)

(72) Inventors: Franz-Peter Firmbach, Emmingen-Liptingen (DE); Svenja Anhorn, Heroldstatt (DE)

(73) Assignee: Aesculap AG, Tuttlingen (DE)

( * ) Notice: Subject to any disclaimer, the term of this patent is extended or adjusted under 35 U.S.C. 154(b) by 251 days.

(21) Appl. No.: 18/328,051

(22) Filed: Jun. 2, 2023

(65) Prior Publication Data
US 2023/0389938 A1 Dec. 7, 2023

(30) Foreign Application Priority Data

Jun. 3, 2022 (DE) ..................... 10 2022 205 694.9

(51) Int. Cl.
*A61B 17/15* (2006.01)
*A61B 17/17* (2006.01)
*A61B 17/16* (2006.01)

(52) U.S. Cl.
CPC ........ *A61B 17/157* (2013.01); *A61B 17/1764* (2013.01); *A61B 17/1675* (2013.01)

(58) Field of Classification Search
CPC .............. A61B 17/157; A61B 17/1675; A61B 17/1764
See application file for complete search history.

(56) References Cited

U.S. PATENT DOCUMENTS

| 5,704,941 A | 1/1998 | Jacober et al. |
| 2015/0045801 A1 | 2/2015 | Axelson, Jr. et al. |
| 2019/0231365 A1 | 8/2019 | Steensen et al. |
| 2021/0244421 A1 | 8/2021 | Siccardi et al. |
| 2022/0211389 A1 | 7/2022 | Gassner et al. |
| 2023/0063563 A1* | 3/2023 | Firmbach ............. A61B 17/157 |

FOREIGN PATENT DOCUMENTS

| JP | 201430536 A | 2/2014 | |
| WO | 2020049421 A1 | 3/2020 | |
| WO | WO-2021209496 A2 * | 10/2021 | ........... A61B 17/157 |
| WO | WO-2022189892 A1 * | 9/2022 | ........... A61B 5/1072 |

* cited by examiner

*Primary Examiner* — Samuel S Hanna
(74) *Attorney, Agent, or Firm* — Christopher A. Rothe; CM Law (57) ABSTRACT A surgical instrument for use in a knee-replacement operation includes a main body configured for releasable fastening on a tibia-cutting block for guiding cutting on a proximal tibia. A first stylus and a second stylus are each mounted on the main body so as to be movable relative to the main body. The first and second styluses each extend along a longitudinal axis between a first end and a second end. The first ends are each designed to make contact with a tibial plateau of the tibia. The first stylus is mounted on the main body so as to be pivotable about a first pivot axis relative to the main body and the second stylus. The second stylus is mounted on the main body so as to be pivotable about a second pivot axis relative to the main body and the first stylus.

20 Claims, 5 Drawing Sheets

SURGICAL INSTRUMENT

CROSS-REFERENCE TO RELATED APPLICATION(S)

This application claims priority under 35 U.S.C. § 119 to German Application No. 10 2022 205 694.9, filed Jun. 3, 2022, the content of which is incorporated by reference herein in its entirety.

FIELD

The present disclosure relates to a surgical instrument for use in a knee-replacement operation, having a main body, which is configured for releasable fastening on a tibia-cutting block for guiding cutting on a proximal tibia, and a first stylus and a second stylus, which are each mounted on the main body so as to be movable relative to the main body and which each extend along a longitudinal axis between a first end and a second end, wherein the first ends are each designed to make contact with a tibial plateau of the tibia.

BACKGROUND

In a knee-replacement operation (also referred to as Total Knee Arthroplasty (TKA)), joint surfaces of the femur and/or of the tibia that have become worn or have been otherwise adversely affected by disease or by injury are replaced by artificial joint surfaces of a knee-joint prosthesis. Such knee-joint prostheses usually comprise a femoral component and a tibial component. The femoral component is implanted at the distal end of the femur. The tibial component is implanted at the proximal end of the tibia.

Prior to the prosthetic components being implanted, the distal femur and the proximal tibia are resected. For this purpose, the surgeon applies different resection cuts and detaches bone and/or cartilage material from the respective bone. The resection adapts the shape of the respective bone to the prosthetic component which is to be incorporated.

The resection can be performed on the basis of different concepts. One concept aims to keep the tensioning of the ligaments of the knee balanced while the joint is moving. This is intended to ensure a better function of the knee-joint prosthesis. This concept is generally referred to as "gap balancing". In other concepts, the surgeon removes a specific quantity of bone and/or cartilage material by means of resection. Such concepts are generally referred to as "measured resection". The guidance of the resection cuts in relation to the patient's anatomy determines the subsequent orientation of the implanted components and, consequently, also the orientation of the prosthetic joint axes. The guidance of the resection cuts is therefore particularly important.

For the guidance of the resection cuts, a distinction is drawn between primarily three approaches: mechanical, anatomic and kinematic. In the case of mechanical alignment, the proximal tibia is resected perpendicularly in relation to the longitudinal axis of the tibia. The resection of the distal femur is correspondingly adapted thereto. If necessary, ligament releases are performed. In the case of anatomic alignment, the attempt is made to resect the tibia at a varus angle of 3°. The femur resection and ligament releases are performed with the aim of achieving a rectilinear hip-knee-ankle axis of the leg. The aim of kinematic alignment (shortened hereinbelow to KA) is to implant the artificial joint surfaces of the prosthetic components level with the natural joint surfaces in their pre-arthritic, non-defective state. Clinical studies have shown that KA can often achieve improved patient satisfaction, since the function of the artificial knee joint is felt to be quite natural.

Against this background, there is a basic need for surgical instruments for implementing the KA that are as precise as possible, easy to use and cost-effective.

WO 2020/049421 A1 discloses a surgical instrument with a main body and two styluses or styli. The main body is configured in the form of a pin or stub and can be fastened on a tibia-cutting-block portion provided for this purpose. The two styluses are each mounted on the main body so as to be pivotable about a common pivot axis relative to the main body and to one another. The two styluses each extend longitudinally between a first end and a second end. The first ends are each designed to make contact with the proximal tibia, more specifically the tibial plateau. In the case of the known surgical instrument, the two styluses are arranged axially one above the other, in different planes, along the common pivot axis. In addition, the two styluses are arranged in a crossed-over manner in the longitudinal direction.

US 2019/0231365 A1 discloses a further surgical instrument for guiding the tibial cut. It is also the case that this known surgical instrument has a pin-form or stub-form main body and two styluses. The two styluses, once again, are mounted on the pin-form or stub-form main body so as to be pivotable about a common pivot axis, are arranged axially one above the other and are also crossed over in the longitudinal direction.

SUMMARY

The present disclosure relates to a surgical instrument for guiding tibial resection. Such instruments are also referred to as a tibial resection guide device.

The object of the present disclosure is to provide a surgical instrument that gives advantages over the prior art and, in particular, makes improved guidance of the proximal tibial cut possible.

This object is achieved in that a first stylus is mounted on the main body so as to be pivotable about a first pivot axis relative to the main body and the second stylus, and in that the second stylus is mounted on the main body so as to be pivotable about a second pivot axis relative to the main body and the first stylus. The present disclosure is based on the insight that mounting the two styluses together on one and the same pivot axis can be disadvantageous. This is because mounting the two styluses together on a single pivot axis means that the two styluses are arranged directly adjacent, one above the other and/or in a crossed-over manner. This can mean that, when the pivot position of one stylus is adjusted, an already adjusted pivot position of the further stylus is adjusted in an unwanted manner. If such an unwanted, erroneous adjustment remains unnoticed, this can result in incorrect guidance of the tibial cut. The present disclosure counteracts this. For this purpose, the two styluses are mounted on the main body independently of one another on a separate pivot axis in each case. The styluses preferably extend longitudinally in a common plane. It is preferably the case that the styluses are not arranged in a crossed-over manner. The first end of the first stylus is configured to make contact with a medial portion of the tibial plateau and the first end of the second stylus is configured to make contact with a lateral portion of the tibial plateau, or vice versa. In one configuration, the two pivot axes should each be understood to be geometrical (axis). In a further configuration, as an alternative or in addition, the two pivot axes are each formed by means of an axle, said axles being formed by a component or portion of the main body. The two pivot axes are preferably oriented proximo-distally.

The positional and directional designations used in this description relate to a patient's body, in particular the tibia, and to this extent are to be understood in accordance with their usual anatomical meaning. Consequently, "anterior" denotes front or located at the front, "posterior" denotes rear or located at the rear, "medial" denotes inner or located on the inside, "lateral" denotes outer or located on the outside, "proximal" denotes towards the centre of the body and "distal" denotes away from the centre of the body. Furthermore, "proximodistal" denotes along, preferably parallel to, a proximal-distal axis, "anteroposterior" denotes along, preferably parallel to, an anterior-posterior axis and "mediolateral" denotes along, preferably parallel to, a medial-lateral axis. The aforementioned axes are oriented orthogonally in relation to one another and can, of course, be understood in relation to X, Y and Z axes not associated with the patient's anatomy. For example, the proximal-distal axis can alternatively be referred to as the X axis. The medial-lateral axis can be referred to as the Y axis. The anterior-posterior axis can be referred to as the Z axis. For the sake of better illustration and simplicity of the designations, it is primarily the aforementioned anatomical positional and directional designations which will be used hereinbelow. Furthermore, designations such as "rear side" of a component or of a portion of the surgical instrument, for example of the main body, are used in relation to a distally oriented viewing direction. By contrast, designations such as "front side" are used in relation to a proximally oriented viewing direction.

In one embodiment of the present disclosure, the first pivot axis and the second pivot axis are arranged on the main body so as to be spaced apart from one another by a mediolateral distance. The mediolateral spacing of the two pivot axes allows the first ends of the two styluses to be positioned to better effect. It is preferably the case that the mediolateral distance corresponds to a customary distance between the medial tibial plateau and the lateral tibial plateau. As a result, with the respective first end positioned correspondingly on the relevant portion of the tibial plateau, the two styluses are oriented approximately parallel. The mediolateral distance is preferably between 4 cm and 12 cm, preferably between 5 cm and 10 cm, particularly preferably between 6 cm and 8 cm.

In a further embodiment of the present disclosure, the first pivot axis and the second pivot axis are parallel to one another. Such a parallel orientation affords advantages. In further embodiments, the pivot axes are not oriented parallel to one another.

In a further embodiment of the present disclosure, the first pivot axis is orthogonal to the longitudinal axis of the first stylus and the second pivot axis is orthogonal to the longitudinal axis of the second stylus. The longitudinal axis of the first stylus will also be referred to hereinbelow as the first longitudinal axis. The longitudinal axis of the second stylus will also be referred to hereinbelow as the second longitudinal axis. Such an orthogonal orientation of the respective pivot axis in relation to the respective longitudinal axis has proven to be advantageous. As an alternative, non-orthogonal orientations are conceivable.

In a further embodiment of the present disclosure, the first pivot axis and the second pivot axis are arranged in a common first plane, which—when the surgical instrument has been fastened on the tibia-cutting block—is orthogonal to a cut-guiding plane of the tibia-cutting block. The cut-guiding plane is the plane in which the tibial resection can be achieved with guidance by means of the tibia-cutting block. For example, the tibia-cutting block has a receiving slit, which is configured to receive and guide a saw blade for performing the resection cut. In this case, the receiving slit defines the cut-guiding plane. As an alternative, or in addition, the tibia-cutting block can have an abutment surface, against which the saw blade can be positioned and guided. In this case, the abutment surface defines the cut-guiding plane. When the tibia-cutting block is being used, the cut-guiding plane extends anteroposteriorly and mediolaterally and, consequently, is a transverse plane. The first plane, in which the two pivot axes are arranged, is parallel to the cut-guiding plane and/or a frontal plane.

In a further embodiment of the present disclosure, the first stylus is mounted on the main body so as to be linearly movable along a first guide axis relative to the main body and to the second stylus, and the second stylus is mounted on the main body so as to be linearly movable along a second guide axis relative to the main body and the first stylus. In this embodiment of the present disclosure, the two styluses are each—in addition to the respective pivoting-movement capability—linearly movable. In addition to the pivot position being adjustable, it is consequently also possible for a linear position to be adjusted. In other words, the two styluses can be displaced along their respective longitudinal axis independently of one another. The longitudinal-displacement capability of the styluses allows, in particular, use on differently sized tibia. In one embodiment, the two guide axes are geometrical. In a further embodiment, the two guide axes, as an alternative or in addition, are structural axles.

In a further embodiment of the present disclosure, the first guide axis is parallel to the longitudinal axis of the first stylus and the second guide axis is parallel to the longitudinal axis of the second stylus. Such a parallel orientation of the respective guide axis in relation to the respective longitudinal axis is advantageous, but not mandatory. Accordingly, further embodiments include guide axes which are not parallel to the respective longitudinal axis.

In a further embodiment of the present disclosure, the first guide axis and the second guide axis are arranged in a common second plane, which—when the surgical instrument has been fastened on the tibia-cutting block—is parallel to a cut-guiding plane of the tibia-cutting block. What has already been said in relation to the cut-guiding plane of the tibia-cutting block applies here. When the surgical instrument is being used, the second plane is a transverse plane. If the surgical instrument has a first plane, in which the two pivot axes are arranged together, the second plane is oriented orthogonally in relation to the first plane. The parallel orientation of the second plane in relation to the cut-guiding plane is advantageous. Further embodiments provide a non-parallel orientation.

In a further embodiment of the present disclosure, the main body has a first bearing pin and a second bearing pin, the first stylus has a first slot, in which the first bearing pin engages for relative movement about the first pivot axis and along a longitudinal-extent direction of the first slot, and the second stylus has a second slot, in which the second bearing pin engages for relative movement about the second pivot axis and along a longitudinal-extent direction of the second slot. This is a particularly preferred embodiment of the present disclosure. The first bearing pin is oriented coaxially in relation to the first pivot axis. The second bearing pin is oriented coaxially in relation to the second pivot axis. In other words, a respective longitudinal extent of the two bearing pins defines the respective pivot axis. The first slot is introduced into the first stylus parallel to the first pivot axis. The second slot is introduced into the second stylus parallel to the second pivot axis. The longitudinal-extent direction of the first slot is orthogonal to the first pivot axis. The longitudinal-extent direction of the second slot is orthogonal to the second pivot axis. The longitudinal-extent direction of the first slot defines a/the first guide axis. The longitudinal-extent direction of the second slot defines a/the second guide axis. This embodiment allows straightforwardly designed, precise and robust pivotable and linearly movable mounting of the two styluses on the main body.

In a further embodiment of the present disclosure, the first bearing pin and the second bearing pin each have two axially spaced-apart radial collars, between which the respective stylus is retained in an axially form-fitting manner. The two radial collars of the first bearing pin counteract unwanted axial displacement of the first stylus. The same applies, mutatis mutandis, to the two radial collars of the second bearing pin. The two radial collars of the first bearing pin are spaced apart from one another along the first pivot axis. The two radial collars of the second bearing pin are spaced apart from one another along the second pivot axis.

In a further embodiment of the present disclosure, at least one of the two radial collars is rotationally asymmetric and elongate in a direction orthogonal to the respective pivot axis. The to this extent rotationally asymmetric and elongate configuration counteracts a tilting movement of the respective contact element. This makes particularly precise positioning of the stylus, more specifically the first end thereof, possible.

In a further embodiment of the present disclosure, there is provided a first fixing device, which is operatively connected to the first stylus and the main body and is configured for releasably fixing the pivoting-movement capability and/or the linear-movement capability of the first stylus, and also a second fixing device, which is operatively connected to the second stylus and to the main body and is configured for releasably fixing the pivoting-movement capability and/or the linear-movement capability of the second stylus. The two fixing devices allow the two styluses to be releasably fixed independently of one another. This is in direct contrast to solutions known from the prior art. The two fixing devices counteract unwanted adjustment of the two styluses once already in position. The two fixing devices are designed differently in respect of different embodiments, for example in the form of a screw-connection, clamping, latching and/or snap-fit mechanism. The first fixing device causes the first stylus to be releasably fixed in a force-fitting and/or form-fitting manner relative to the main body. The same applies, mutatis mutandis, to the second fixing device.

In a further embodiment of the present disclosure, the main body has a plate portion with a planar rear side, which—when the surgical instrument has been fastened on the tibia-cutting block—is parallel to a cut-guiding plane of the tibia-cutting block. In this embodiment of the present disclosure, the main body is of plate-form configuration and/or is in the form of a plate. When the surgical instrument is being used, the plate portion extends mediolaterally and anteroposteriorly. The rear side is oriented proximally, i.e. a normal direction of the rear side is oriented in the proximal direction. The rear side is planar and parallel to the cut-guiding plane. What has already been said in relation to the cut-guiding plane of the tibia-cutting block applies here. The to this extent planar and parallel rear side allows a straightforward visual check of the orientation of the surgical instrument. The rear side is preferably arranged on a proximodistal level which corresponds to the level of the subsequent condylar line of the tibial component to be implanted. A proximal distance between the rear side and the cut-guiding plane is preferably adapted correspondingly. The aforementioned distance is preferably between X1 mm and X2 mm, preferably between X3 mm and X4 mm, particularly preferably between X5 mm and X6 mm.

In a further embodiment of the present disclosure, the main body has a spring-biased latching lever, which—when the surgical instrument has been fastened on the tibia-cutting block—is releasably latched to a latching portion of the tibia-cutting block. This embodiment of the present disclosure allows particularly straightforward and reliable releasable fastening of the surgical instrument on the tibia-cutting block. The latching lever is configured for manual actuation. The latching lever is preferably arranged on a front side of the plate portion, the front side being located distally opposite the rear side of the plate portion. The latching lever can preferably be displaced relative to the plate portion between a fastening position and an unlatched position. In the fastening position, the latching lever is releasably latched to the latching portion. In the unlatched position, the aforementioned latching action has been unlatched, so that the main body can be removed from the tibia-cutting block.

The present disclosure additionally relates to a surgical instrument system for use in a knee-replacement operation, with a surgical instrument as described above and with a tibia-cutting block, on which the surgical instrument is releasably fastened. In one embodiment, the surgical instrument system additionally has an extramedullar guide rod, which is releasably fastened on a tibia-cutting block portion provided for this purpose.

BRIEF DESCRIPTION OF THE DRAWINGS

Further advantages and features of the present disclosure can be gathered from the description of preferred exemplary embodiments of the present disclosure, which are illustrated with reference to the drawings, in which.

DETAILED DESCRIPTION

FIGS. 1 to 5 show a surgical instrument 1 which is intended for use in a knee-replacement operation and has a main body 100, a first stylus 200 and a second stylus 300.

The surgical instrument 1 is releasably fastened, in a manner which will be described in more detail, on a tibia-cutting block 400. An extramedullar guide rod 600 is releasably fastened on the tibia-cutting block 400. Together with the tibia-cutting block 400 and the extramedullary guide rod 600, the surgical instrument 1 forms a surgical instrument system 10.

Figure 1:
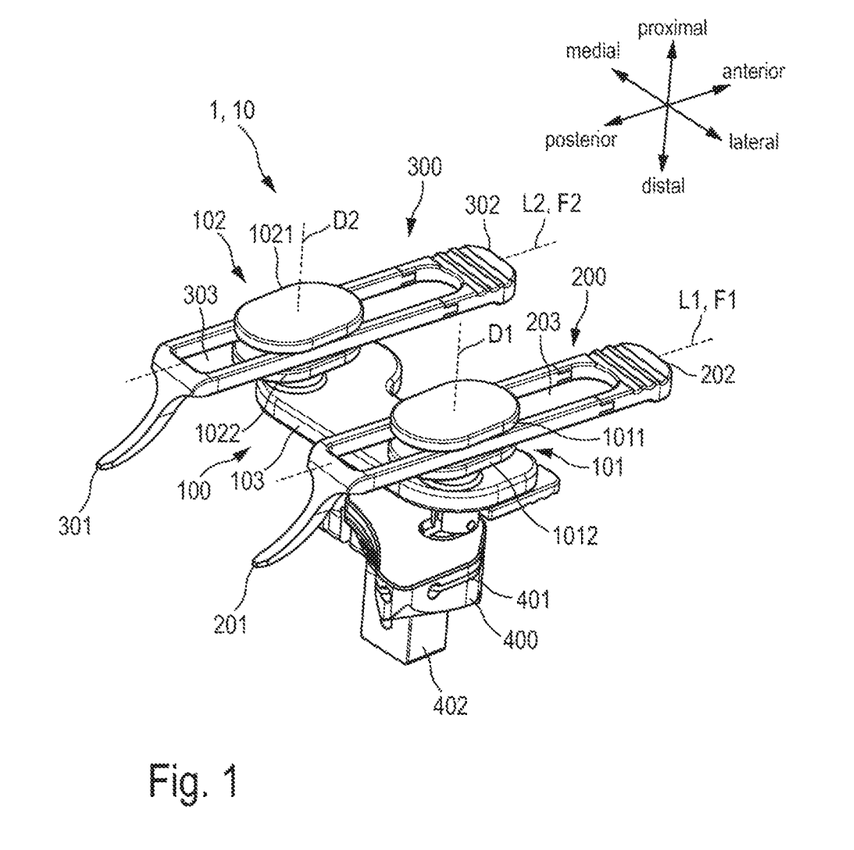
FIG. 1 shows a schematic perspective illustration of one embodiment of a surgical instrument system according to the present disclosure with one embodiment of a surgical instrument according to the present disclosure.
Figure 2:
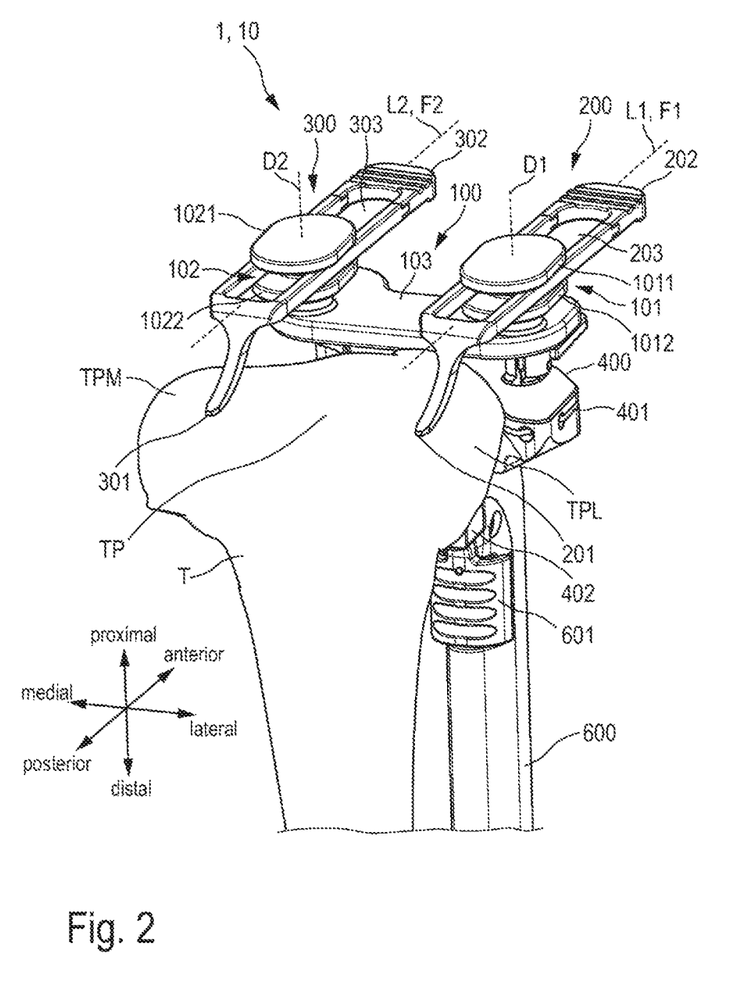
FIG. 2 shows a schematic perspective illustration of an intraoperative situation in which the surgical instrument system according to FIG. 1 is oriented on a proximal tibia.
Figure 3:
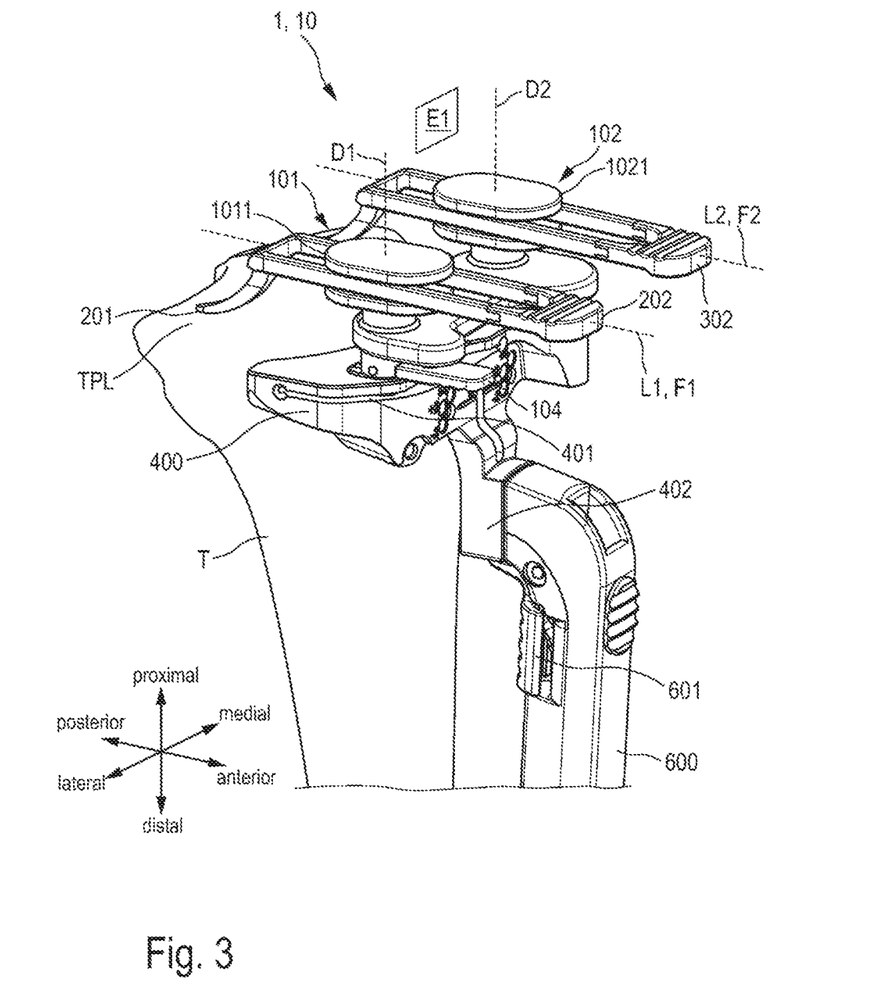
FIG. 3 shows a further schematic perspective illustration of the intraoperative situation according to FIG. 2.

The tibia-cutting block 400 is configured, in a manner which is known to a person skilled in the art, for guiding cutting on a proximal tibia T (see FIGS. 2 and 3). For this purpose, the tibia-cutting block 400 has a receiving slit 401, which is configured to receive and guide a saw blade for the resection of the proximal tibia T. The receiving slit 401 defines a cut-guiding plane SF (see FIGS. 4 and 5), in which the aforementioned resection cut is guided by means of the tibia-cutting block 400. The tibia-cutting block 400 additionally has a fastening portion 402. The latter is configured, in a manner which is known to a person skilled in the art, for releasable fastening on the extramedullar guide rod 600. The extramedullar guide rod 600 has a fastening mechanism 601, which interacts, in a manner which is not shown specifically, with the fastening portion 402. The extramedullary guide rod 600 serves to orient the tibia-cutting block 400 in relation to an anterior edge (not referred to any more specifically) of the tibia T.

The surgical instrument 1 is provided to orient the tibia-cutting block 400 in relation to anatomical landmarks of the proximal tibia T. The surgical instrument 1 can also be referred to as a tibial resection guide device or a tibial cut alignment device. Before the specific function of the surgical instrument 1 is discussed in more detail, further details of the design thereof will be explained first of all.

The main body 100 is configured, in a manner which will be described in more detail, for releasable fastening on the tibia-cutting block 400.

The first stylus 200 and the second stylus 300 are each mounted on the main body 100 so as to be movable relative to the same and each have a first end 201, 301 and a second end 202, 302. The first stylus 200 extends longitudinally along a first longitudinal axis L1. The second stylus 300 extends longitudinally along a second longitudinal axis L2. The two longitudinal axes L1, L2 each define a main-extent direction of the respective stylus 200, 300. The two first ends 201, 301 are each configured to make contact with a tibial plateau TP of the proximal tibia T (see FIGS. 2 and 3). In the present case, the first end 201 of the first stylus 200 is configured to make contact with a lateral portion of the tibial plateau TP. This portion of the tibial plateau TP will be referred to hereinbelow as the lateral tibial plateau TPL. The first end 301 of the second stylus 300 is configured to make contact with a medial portion of the tibial plateau TP. This portion of the tibial plateau TP will also be referred to hereinbelow as the medial tibial plateau TPM. In respect of the intraoperative situation shown in the figures, it is also possible for the styluses 200, 300 to be referred to as the lateral contact element 200 and medial contact element 300.

The first stylus 200 is mounted on the main body 100 so as to be pivotable about a first pivot axis D1 relative to the main body 100 and relative to the second stylus 300. The second stylus 300 is mounted on the main body 100 so as to be pivotable about a second pivot axis D2 relative to the main body 100 and relative to the first stylus 200. The pivotable mounting of the two styluses 200, 300 separately and/or independently of one another allows, in particular, improved positioning of the two first ends 201, 301 on the tibial plateau TP. The improved positioning is linked to particularly precise orientation of the tibia-cutting block 400 and therefore also of the cut-guiding plane SF.

When the surgical instrument 1 is being used, the two pivot axes D1, D2 are oriented proximodistally. The cut-guiding plane SF extends mediolaterally and anteroposteriorly.

In the embodiment shown, the first pivot axis D1 and the second pivot axis D2 are parallel to one another. In addition, the first pivot axis D1 and the second pivot axis D2 are arranged on the main body 100 so as to be spaced apart from one another by a mediolateral distance C (see FIG. 4). In the embodiment shown, the mediolateral distance C corresponds to a mediolateral distance (with no reference sign) between the medial tibial plateau TPM and the lateral tibial plateau TPL. In the case of the two first ends 201, 301 making contact with the respective portion of the tibial plateau TP as required, the two styluses 200, 300 therefore extend longitudinally at least essentially parallel to one another.

In the embodiment shown, the first pivot axis D1 is orthogonal to the first longitudinal axis L1. The second pivot axis D2 is orthogonal to the second longitudinal axis L2.

Figure 5:
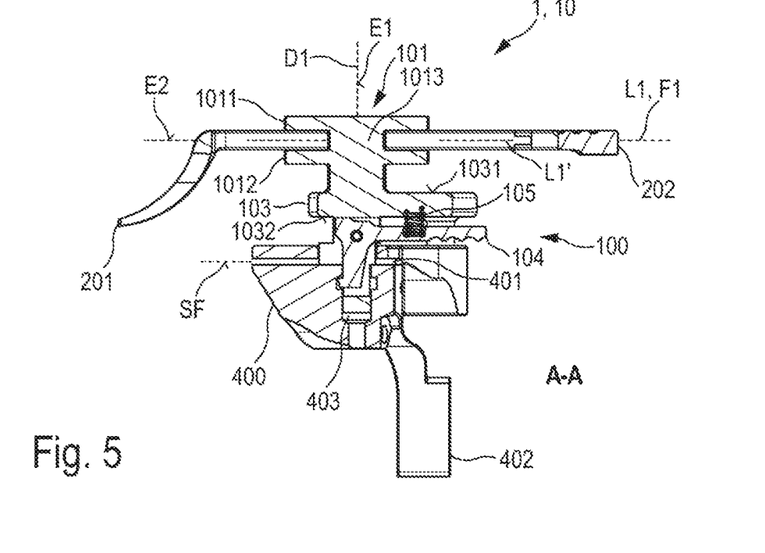
FIG. 5 shows a schematic sectional illustration taken along a section line A-A according to FIG. 4.

In the embodiment shown, the first pivot axis D1 and the second pivot axis D2 are arranged in a common first plane E1 (see FIGS. 3 and 5). The first plane E1 is orthogonal to the cut-guiding plane SF. As a result, when the respective stylus 200, 300 pivots, the two first ends 201, 301 each move at a constant distance from the cut-guiding plane SF.

In the embodiment shown, in addition to the aforementioned pivoting-movement capability of the two styluses 200, 300, linear movement of the two styluses 200, 300 is possible. The linear-movement capability of the two styluses 200, 300 relative to the main body 100 and relative to one another provides for further-improved positioning of the two first ends 201, 301 on the tibial plateau TP.

In the present case, the first stylus 200 is mounted on the main body 100 so as to be linearly movable along a first guide axis F1 relative to the main body 100 and relative to the second stylus 300. The second stylus 300 is mounted on the main body so as to be linearly movable along a second guide axis F2 relative to the main body 100 and relative to the first stylus 200.

In the embodiment shown, the first guide axis F1 is parallel to the first longitudinal axis L1. The second guide axis F2 is parallel to the second longitudinal axis L2. Consequently, the first guide axis F1 is orthogonal to the first pivot axis D1 and the second guide axis F2 is orthogonal to the second pivot axis D2. In addition, the first guide axis F1 is orthogonal to the second pivot axis D2. The second guide axis F2 is orthogonal to the first pivot axis D1.

The orientation of the first guide axis F1 in relation to the main body 100 and/or the second guide axis F2 is dependent on the pivot position of the first stylus 200 in relation to the first pivot axis D1. The same applies, mutatis mutandis, to the orientation of the second guide axis F2.

Figure 4:
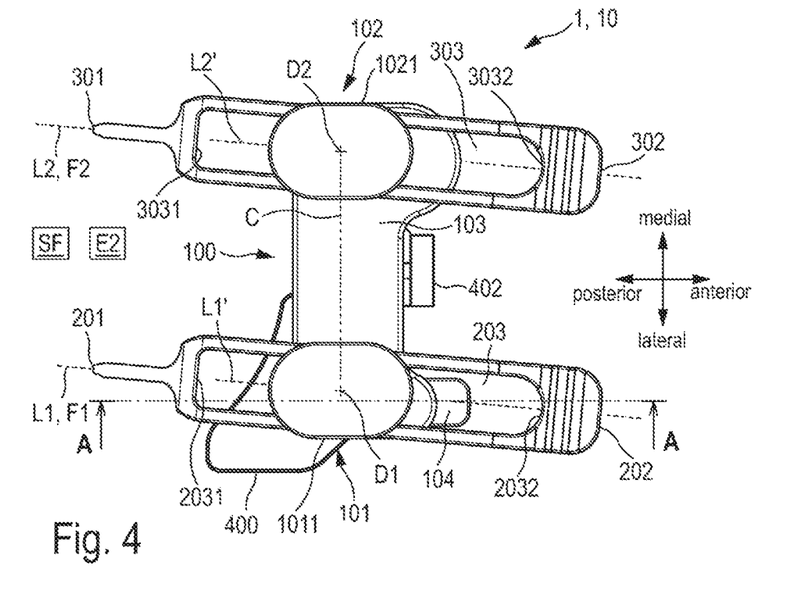
FIG. 4 shows a schematic plan view of the surgical instrument system according to FIGS. 1 to 3.

The first guide axis F1 and the second guide axis F2 are arranged in a common second plane E2 (see FIGS. 4 and 5). The second plane E2 is parallel to the cut-guiding plane SF. When the surgical instrument 1 is being used, the second plane E2 therefore extends anteroposteriorly and mediolaterally. The aforementioned parallel orientation of the second plane E2 ensures that, when the respective stylus 200, 300 moves linearly, the two first ends 201, 301 remain at a constant distance in relation to the cut-guiding plane SF. In the embodiment shown, it is not just the two guide axes F1, F2 which are arranged in a/the common second plane E2. Rather, this also applies to the two styluses 200, 300. Although the two styluses 200, 300 are arranged mediolaterally one beside the other, they are not arranged proximodistally one above the other and/or in an offset manner and/or they are not crossed over.

The pivotable mounting of the two styluses 200, 300 is designed differently in respect of different embodiments. The same applies as far as the linearly movable mounting is concerned.

In the embodiment shown, the main body 100 has a first bearing pin 101 and a second bearing pin 102. The first stylus 200 is mounted on the first pin 101 so as to be pivotable and linearly movable. The second stylus 300 is mounted on the second bearing pin 102 so as to be pivotable and linearly movable. For this purpose, the first stylus 200 has a first slot 203. The first bearing pin 101 engages in the first slot 203 for relative movement about the first pivot axis D1 and along a longitudinal-extent direction L1' of the first slot 203. The same applies, mutatis mutandis, in relation to the second stylus 300. The second stylus 300 has a second slot 303. The second bearing pin 102 engages in the second slot 303 so as to be pivotable about the second pivot axis D2 and for relative movement along a longitudinal-extent direction L2' of the second slot 303.

The first bearing pin 101 extends longitudinally along the first pivot axis D1. In other words, an axial direction of the first bearing pin 101 defines the first pivot axis D1. The same applies, mutatis mutandis, to the second bearing pin 102. The axial direction thereof defines the second pivot axis D2.

The longitudinal-extent direction L1' of the first slot 203 defines the first guide axis F1. The longitudinal-extent direction L2' of the second slot 303 defines the second guide axis F2.

In the embodiment shown, the longitudinal extent L1' of the first slot 203 is coaxial in relation to the first longitudinal axis L1. The longitudinal-extent direction L2' of the second slot 303 is coaxial in relation to the second longitudinal axis L2.

The two styluses 200, 300 are each guided for sliding movement on the relevant bearing pin 101, 102.

The first slot 203 extends longitudinally between a first end 2031 and a second end 2032. The first end 2031 functions as a stop for anterior relative displacement of the first stylus 200. The second end 2032 functions as a stop for posterior relative displacement of the first stylus 200. The second slot 303 extends longitudinally between a first end 3031 and a second end 3032. What has already been said in relation to the function thereof applies mutatis mutandis. The first slot 203 extends right through the first stylus 200 in the axial direction of the first bearing pin 101 and/or along the first pivot axis D1. The first slot 203 is consequently a through-hole. The same applies, mutatis mutandis, to the second slot 303.

In the embodiment shown, both the two styluses 200, 300 and the two bearing pins 101, 102 are each configured identically to one another. Further structural and functional features of the two bearing pins 101, 102 will therefore be explained hereinbelow primarily with reference to the first bearing pin 101. What is said in relation to the first bearing pin 101 also applies, mutatis mutandis, to the second bearing pin 102.

The first bearing pin 101 has a first radial collar 1011 and a second radial collar 1012. The two radial collars 1011, 1012 are spaced apart from one another along the first pivot axis D1. The first stylus 200 is retained in a form-fitting manner between the two radial collars 1011, 1012, along the first pivot axis D1. In addition, the first stylus 200 is guided between the two radial collars 1011, 1012 for sliding movement about the first pivot axis D1 and along the first guide axis F1. The two radial collars 1011, 1012 are oriented parallel to one another.

In addition, the first bearing pin 101 has a central portion 1013. The central portion 1013 is arranged between the first radial collar 1011 and the second radial collar 1012, along the first pivot axis D1. The central portion 1013 has a rotationally symmetrical cross section. The first stylus 200 is guided on the central portion 1013 for sliding movement about the first pivot axis D1. In addition, the first stylus 200 is retained in a form-fitting manner on the central portion 1013 (for translatory movement) in a direction perpendicular to the first guide axis F1 in the second plane E2.

The two radial collars 1011, 1022 are each rotationally asymmetrical and elongate. The rotational asymmetry relates to the first pivot axis D1. The elongate design relates to the anteroposterior axis depicted in the figures. The rotationally asymmetric and/or elongate configuration of the two rotary portions 1011, 1012 affords advantages in relation to the movable mounting of the first stylus 200. In particular, unwanted tilting movement of the first stylus 200 is counteracted.

In a manner corresponding to the first bearing pin 101, the second bearing pin 102 has a first radial collar 1021 and a second radial collar 1022 and also a central portion (with no reference sign). In all other respects, reference is made to what has been disclosed in relation to the first bearing pin 101.

In the embodiment shown, the main body 100 has a plate portion 103. The plate portion extends mediolaterally and anteroposteriorly. The first bearing pin 101 and the second bearing pin 102 project axially from the plate portion 103. The plate portion 103 has a rear side 1031. The bearing pins 101, 102 project specifically from the rear side 1031. The rear side 1031 is oriented proximally, i.e. a normal direction (not referred to any more specifically) of the rear side 1031 is oriented in the proximal direction. In addition, the plate portion 103 has a front side 1032, which is located distally opposite the rear side 1031. In the embodiment shown, the rear side 1031 is planar and parallel to the cut-guiding plane SF. The aforementioned orientation of the rear side 1031 allows a straightforward visual check of the orientation of the cut-guiding plane SF.

The releasable fastening of the main body on the tibia-cutting block is different in respect of different embodiments. It is basically conceivable to have a latching, clamping, screw-connection, snap-fit mechanism and/or some other type of releasable form-fitting and/or force-fitting joining connection.

In the embodiment shown, the main body 100 has a latching lever 104. In the configuration shown in the figures, the latching lever 104 is releasably latched to a latching portion 403 of the tibia-cutting block 400. The latching lever 104 can be displaced relative to the plate portion 103 between a latching position and an unlatched position. The latching position can be seen in detail, in particular, in FIG. 5. In the latching position, the latching lever 104 releasably interacts in a form-fitting manner with the latching portion 403. In the unlatched position (not illustrated in the figures), the latching lever 104 has been displaced relative to the plate portion 103, the latching connection having been disengaged. In the embodiment shown, the latching lever 104 is pivotable about a pivot axis (not referred to any more specifically) relative to the plate portion 103. In addition, the latching lever 104 is spring-biased in the direction of the latching position by means of a spring element 105. The spring element 105 counteracts any unwanted release of the latching connection. In the embodiment shown, the spring element 105 is a coil spring. The spring element 105 has one end supported on the plate portion 103 and the other end supported on the latching lever 104.

Figure 6:
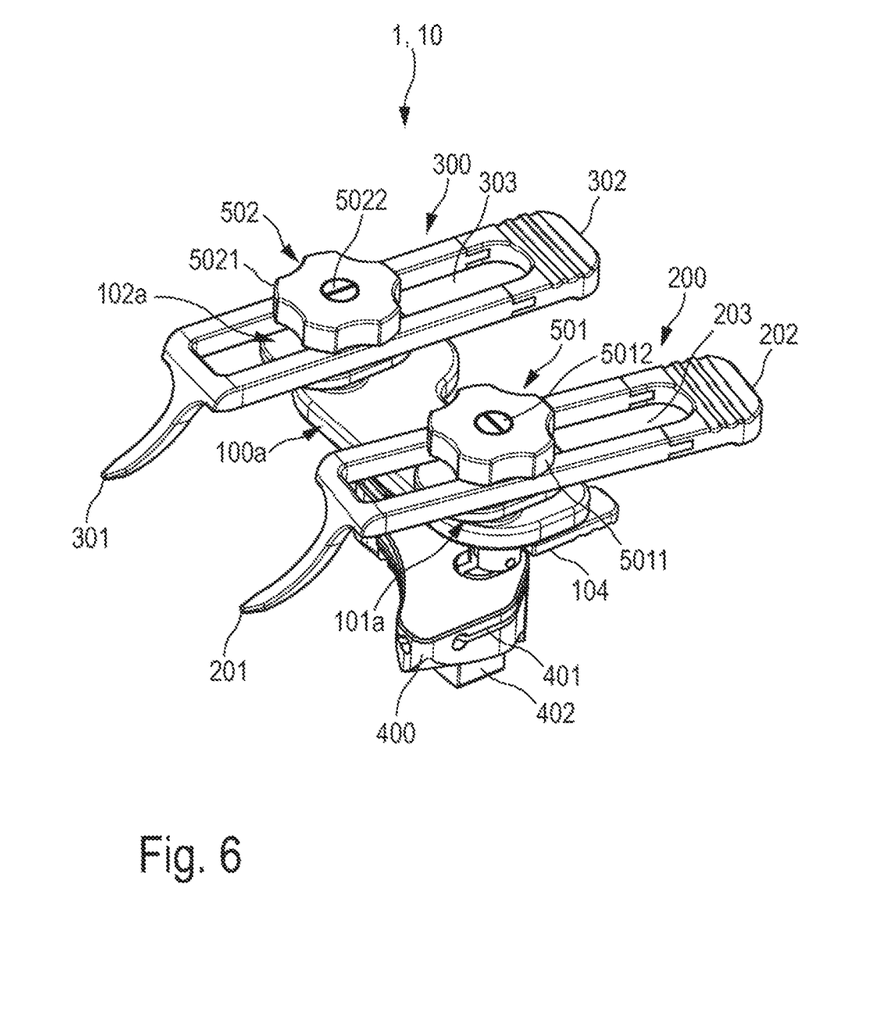
FIG. 6 shows a schematic perspective illustration of a further embodiment of a surgical instrument system according to the present disclosure.

FIG. 6 shows a further embodiment of a surgical instrument 1a according to the present disclosure, which together with the tibia-cutting block 400 forms a further embodiment of a surgical instrument system 10a according to the present disclosure. In addition, the surgical instrument system 10*a* can comprise the/a extramedullar guide rod 600. In respect of construction and function, the surgical instrument 1*a* is essentially identical to the surgical instrument 1 according to FIGS. 1 to 5. To avoid repetition, it is therefore the case that only essential differences of the surgical instrument 1*a* in relation to the surgical instrument 1 according to FIGS. 1 to 5 will be discussed hereinbelow. Functionally identical components and/or portions will not be explained separately. Instead, reference is expressly made to the description of the surgical instrument 1.

In contrast to the surgical instrument 1 according to FIGS. 1 to 5, the surgical instrument 1*a* has a first fixing device 501 and a second fixing device 502. The two fixing devices 501, 502 allow the respective pivoting-movement capability and linear-movement capability of the two styluses 200, 300 to be fixed. In respect of design and of function, the two fixing devices 501, 502 are identical. To avoid repetition, it is therefore primarily the first fixing device 501 which will be discussed. What is described in relation to the first fixing device 501 also applies, mutatis mutandis, to the second fixing device 502.

The first fixing device 501 is operatively connected to the first stylus 200 and the main body 100*a*. The first fixing device 501 has a securing wheel 5011 and a threaded portion 5012. The securing wheel 5011 has an internal thread (not referred to any more specifically) and is screwed to the threaded portion 5012 for threaded movement. The threaded portion 5012 is arranged at one end of the first bearing pin of the main body 100*a*. The securing wheel 5011 is screwed to the threaded portion 5012 for threaded movement along the first pivot axis. For the purpose of fixing the relative-movement capability of the first stylus 200, the securing wheel 5011 is screwed tight in the clockwise direction. As a result, the securing wheel 5011 presses onto a rear side (not referred to any more specifically) of the first stylus 200. As a result, the first stylus 200 is clamped firmly between the securing wheel 5012 and the second radial collar (with no reference sign) of the main body 100*a*. For the purpose of releasing the fixing action, the securing wheel 5011 is actuated in the anticlockwise direction.

The main body 100*a* is essentially identical to the main body 100 of the surgical instrument 1 according to FIGS. 1 to 5. The essential difference resides in the design of the two bearing pins of the main body 100*a*. In contrast to the two bearing pins 101, 102, the bearing pins 101*a*, 102*a* each have no first radial collar. The threaded portions 5012, 5022 are provided instead. In simple terms, the two securing wheels 5011, 5021 replace the respective first radial collar.

The invention claimed is:

1. A surgical instrument for use in a knee-replacement operation, the surgical instrument comprising:
 a main body configured for releasable fastening on a tibia-cutting block for guiding cutting on a proximal tibia of a tibia;
 a first stylus; and
 a second stylus,
 the first stylus and the second stylus each being mounted on the main body so as to be movable relative to the main body,
 the first stylus and the second stylus each having a first end and a second end and extending along a longitudinal axis between the first end and the second end,
 the first ends each configured to make contact with a tibial plateau of the tibia,
 the first stylus being mounted on the main body so as to be pivotable about a first pivot axis relative to the main body and the second stylus, and
 the second stylus being mounted on the main body so as to be pivotable about a second pivot axis relative to the main body and the first stylus,
 wherein:
  the main body has a first bearing pin,
  the first stylus has a first slot, in which the first bearing pin engages for relative movement about the first pivot axis and along a longitudinal-extent direction of the first slot,
  the first bearing pin has axially spaced-apart first and second radial collars between which the first stylus is retained in an axially form-fitting manner,
  the first radial collar of the first bearing pin is rotationally asymmetric and elongate in a direction orthogonal to the first pivot axis and immovably fixed to the main body, and
  the first stylus is rotatable about the first axis relative to the first radial collar of the first bearing pin.

2. The surgical instrument according to claim 1, wherein the first pivot axis and the second pivot axis are arranged on the main body so as to be spaced apart from one another by a mediolateral distance.

3. The surgical instrument according to claim 1, wherein the first pivot axis and the second pivot axis are parallel to one another.

4. The surgical instrument according to claim 1, wherein the first pivot axis is orthogonal to the longitudinal axis of the first stylus, and the second pivot axis is orthogonal to the longitudinal axis of the second stylus.

5. The surgical instrument according to claim 1, wherein the first pivot axis and the second pivot axis are arranged in a common first plane that is orthogonal to a cut-guiding plane of the tibia-cutting block when the surgical instrument has been fastened on the tibia-cutting block.

6. The surgical instrument according to claim 1, wherein the first stylus is mounted on the main body so as to be linearly movable along a first guide axis relative to the main body and the second stylus, and the second stylus is mounted on the main body so as to be linearly movable along a second guide axis relative to the main body and the first stylus.

7. The surgical instrument according to claim 6, wherein the first guide axis is parallel to the longitudinal axis of the first stylus, and the second guide axis is parallel to the longitudinal axis of the second stylus.

8. The surgical instrument according to claim 6, wherein the first guide axis and the second guide axis are arranged in a common second plane that is parallel to a cut-guiding plane of the tibia-cutting block when the surgical instrument has been fastened on the tibia-cutting block.

9. The surgical instrument according to claim 1, wherein:
 the main body has a second bearing pin,
 and
 the second stylus has a second slot, in which the second bearing pin engages for relative movement about the second pivot axis and along a longitudinal-extent direction of the second slot.

10. The surgical instrument according to claim 9, wherein:
 the second bearing pin has axially spaced-apart first and second radial collars between which the second stylus is retained in said axially form-fitting manner.

11. The surgical instrument according to claim 10, wherein the first radial collar of the second bearing pin is rotationally asymmetric and elongate in a direction orthogonal to the respective pivot axis and immovably fixed to the main body, and the second stylus is rotatable about the second pivot axis relative to the first radial collar of the second bearing pin.

12. The surgical instrument according to claim 1, further comprising:
a first fixing device operatively connected to the first stylus and the main body, the first fixing device configured for releasably fixing a pivoting-movement capability and/or a linear-movement capability of the first stylus, and
a second fixing device operatively connected to the second stylus and the main body, the second fixing device configured for releasably fixing a pivoting-movement capability and/or a linear-movement capability of the second stylus.

13. The surgical instrument according to claim 1, wherein the main body comprises a plate portion with a planar rear side, which is parallel to a cut-guiding plane of the tibia-cutting block when the surgical instrument is fastened on the tibia-cutting block.

14. The surgical instrument according to claim 1, wherein the main body has a spring-biased latching lever releasably latched in a form-fitting manner to a latching portion of the tibia-cutting block when the surgical instrument is fastened on the tibia-cutting block.

15. A surgical instrument system for use in a knee-replacement operation, the surgical instrument system comprising:
the surgical instrument according to claim 1; and
a tibia-cutting block, on which the surgical instrument is releasably fastened.

16. The surgical instrument according to claim 1, wherein the first radial collar of the first bearing pin is monolithically formed with the main body.

17. The surgical instrument according to claim 1, wherein the first radial collar of the first bearing pin is located closer to the main body than the second radial collar of the first bearing pin.

18. The surgical instrument according to claim 17, wherein the second radial collar of the first bearing pin is rotationally asymmetric and elongate in the direction orthogonal to the first pivot axis and immovably fixed to the main body.

19. The surgical instrument according to claim 17, wherein the second radial collar is monolithically formed with the main body.

20. The surgical instrument according to claim 17, wherein the second radial collar comprises a securing wheel configured to fix the first stylus against moving relative to the first bearing pin.

* * * * *